United States Patent [19]

MacCracken et al.

[11] Patent Number: 4,608,836
[45] Date of Patent: Sep. 2, 1986

[54] MULTI-MODE OFF-PEAK STORAGE HEAT PUMP

[75] Inventors: Calvin D. MacCracken; Mark M. MacCracken; Brian M. Silvetti, all of Englewood, N.J.

[73] Assignee: Calmac Manufacturing Corporation, Englewood, N.J.

[21] Appl. No.: 828,242

[22] Filed: Feb. 10, 1986

[51] Int. Cl.[4] .............................................. F25B 29/00
[52] U.S. Cl. ........................................ 62/325; 62/406; 62/430; 62/434; 165/59
[58] Field of Search ................. 62/325, 430, 434, 59, 62/406, 412, 435; 165/59

[56] References Cited

U.S. PATENT DOCUMENTS

| | | | |
|---|---|---|---|
| 1,969,187 | 8/1934 | Schutt | 62/325 X |
| 2,030,032 | 2/1936 | Keyes | 62/434 X |
| 2,460,623 | 2/1949 | Zoppola | 62/434 |
| 2,935,857 | 5/1960 | McFarlan | 62/435 X |
| 3,069,867 | 12/1962 | Ringquist | 62/325 X |
| 3,277,668 | 10/1966 | Foster | 62/434 |
| 3,500,655 | 3/1970 | Lyons | 62/325 X |
| 4,071,080 | 1/1978 | Bridgers | 165/59 |

Primary Examiner—Lloyd L. King
Attorney, Agent, or Firm—Charles J. Brown

[57] ABSTRACT

A multi-mode off-peak storage heat pump system for a building which includes a unidirectional flow refrigerant circuit and a brine circuit in selective heat exchange relation with one another, each being connected to a dual coil in ducts wherein air can be circulated within and between the inside and outside of the building, and an ice bank in the brine circuit for coolness and low-level heat storage, the system providing heating and cooling with no refrigerant reversing valves or coil defrost means and with optimum off-peak power utilization.

7 Claims, 8 Drawing Figures

FIG. 1

FIG. 2
MODE A – ICE MAKING

FIG. 3
MODE B - HEATING

FIG. 4
MODE C - COOLING

FIG. 5
MODE D - AMBIENT MELTING
(RESIDENTIAL)

FIG. 7
MODE F - ECONOMIZER
(COMMERCIAL)

FIG. 8
MODE G - EXHAUST

MULTI-MODE OFF-PEAK STORAGE HEAT PUMP

BACKGROUND OF THE INVENTION

Rooftop units for cooling, heating and exhausting the air of a building are very common. They are typically installed on stores, restaurants, theaters and other buildings which are not sufficiently large to warrant a central chiller of the evaporative cooling tower type. These unitary systems include a compressor packaged with an air-cooled condenser blower-and-coil and also a recirculating air blower-and-coil. Often they operate in various modes including a reverse cycle for the refrigerant so that heat can be provided by the compressor pumping heat from the outdoor air entering the building, which means that the condenser coil converts into an evaporator coil and a recirculating air coil becomes a condenser. This requires a four-way reversing valve, a defrost cycle on the outdoor air coil and relatively complicated controls, valves, refrigerant accumulators, etc. One of the advantages of such rooftop units is that they do not involve the use of gas as a fuel and therefore operate without regard to fuel shortages and gas pressure fluctuation.

A significant disadvantage of rooftop units of this sort is that their air-cooled condensers are notoriously inefficient. During peak-load conditions on hot summer afternoons the air-cooled condensers often heat up to 140 degrees F. to reject heat, thus forcing the compressors to work much harder and accomplish less cooling precisely when it is most needed. On hot summer days conventional rooftop units are among the worst non-residential contributors to utility peak loads because of this low efficiency combined with low output. Many utilities have offered subsidies to users who avoid peak loads from rooftop air conditioning units using air-cooled condensers. Levelling of peak loads with inexpensive and uncomplicated air heating and cooling equipment is one of the principal purposes of the present invention.

SUMMARY OF THE INVENTION

A multi-mode off-peak storage heat pump system for a building is provided by the invention. It includes ducts for conveying air within and between the inside and outside of the building. A selectively operable blower is provided in the ducts for circulating air therethrough. Damper means are provided in the ducts having selective settings for directing the air within and between the inside and outside of the building. Selectively operable dual coil means are located in the ducts having refrigerant condensing and brine air-cooling loops. There is a selectively operable unidirectional refrigerant circuit which comprises a compressor for directing gaseous refrigerant to the refrigerant loop to be air-cooled and condensed, and a heat exchanger-evaporator in which the condensed refrigerant from the refrigerant loop is evaporated to gas. A selectively operable brine circuit is provided which includes a coolness and low-level heat storage container through which brine is circulatable in heat exchange relation with the phase-change material. A selectively operable electric heater is included for warming the brine entering the storage container to melt the phase-change material. Pump means direct the brine leaving the storage container through either a first subcircuit to the heat exchanger-evaporator for chilling of the brine to below the freezing temperature of the phase-change material or a second subcircuit to the coil means brine loop for cooling of air.

This system is operable in various modes. The refrigerant and brine circuits and first brine subcircuit may be operated with an outside-to-outside damper setting to freeze the phase-change material with chilled brine or with an inside-to-inside damper setting to additionally heat inside air. Alternatively only the brine circuit may be operated, in its second subcircuit mode, with an inside-to-inside damper setting to cool inside air or with an outside-to-outside damper setting to melt the phase-change material by outside air heat or with no air circulation to melt the phase-change material by electric heat during off-peak loads. Alternatively neither circuit may be operated and the damper setting may be outside-to-inside so as to cool inside air or with an inside-to-outside damper setting to exhaust inside air.

In a preferred form of the invention the coil means is a unitary coil device containing dual refrigerant condensing and brine air-cooling loops. A liquid-suction heat exchanger is preferably provided in the refrigerant circuit between the refrigerant loop and the heat exchanger-evaporator for cooling the condensed refrigerant and superheating the gaseous refrigerant entering the compressor. An expansion valve may be provided in the refrigerant circuit ahead of the heat exchanger-evaporator for controlling flow of the cooled condensed refrigerant. Temperature sensing means may be included between the heat exchanger-evaporator circuit and the compressor for operating this expansion valve to control the superheating of the gaseous refrigerant and thus to minimize entry of liquid into the compressor.

In the system of the invention a single blower performs both the condenser and recirculation functions. It operates as a condenser-blower during off-peak ice-making and as a recirculating cool-air blower during on-peak periods. The heat exchanger-evaporator in which the refrigerant is evaporated always operates as an evaporator and the refrigerant loop in the coil means always operates as a condensor. The refrigerant therefore flows only in one direction through its circuit and no reversing valves are required.

The phase-change material in the coolness and low-level heat storage container is preferably water. It will be recognized that the invention therefore provides an air-to-air heat pump which totally avoids coil frosting and therefore no defrosting devices are required. The system can store daytime temperatures above freezing and deliver them to the heat pump at night or for early morning warm-up when temperatures are below freezing and when heat pumps do not work efficiently. Thus, night set-back of space thermostats can be utilized for conservation of electrical energy where ordinarily it is not possible because of the low temperatures involved. The brine loop in the coil means cannot frost because it only receives temperatures of melting ice.

These and other advantages of the multi-mode off-peak storage heat pump system of the invention will become apparent from the following description of preferred embodiment of the apparatus and its various modes of operation.

DESCRIPTION OF PREFERRED EMBODIMENT

The various components of the system of the invention capable of carrying out the different modes of operation described below are shown schematically in FIG. 1. Ducting means for conveying air within and between the inside and outside of the building are shown to include ducts 10 and 11 opening to the outside and ducts 12 and 13 communicating with the inside of the building. They are interconnected by a plenum 14 in which is located a single one-speed blower 15. Damper means are located in these ducts with selective settings for directing the air circulated by the blower 15 both within and between the inside and outside of the building. The damper means are schematically illustrated by a damper 17 shown by dotted lines to be located within the ducts 10 and 12 downstream from the blower 15 and a damper 18 shown in dotted lines to be located in the ducts 11 and 13 upstream of the blower 15. The damper 17 is shown to be movable about a suitable pivot from a setting A to a setting B. Similarly the damper 18 is movable about a pivot between a setting C and a setting D.

Figure 2:
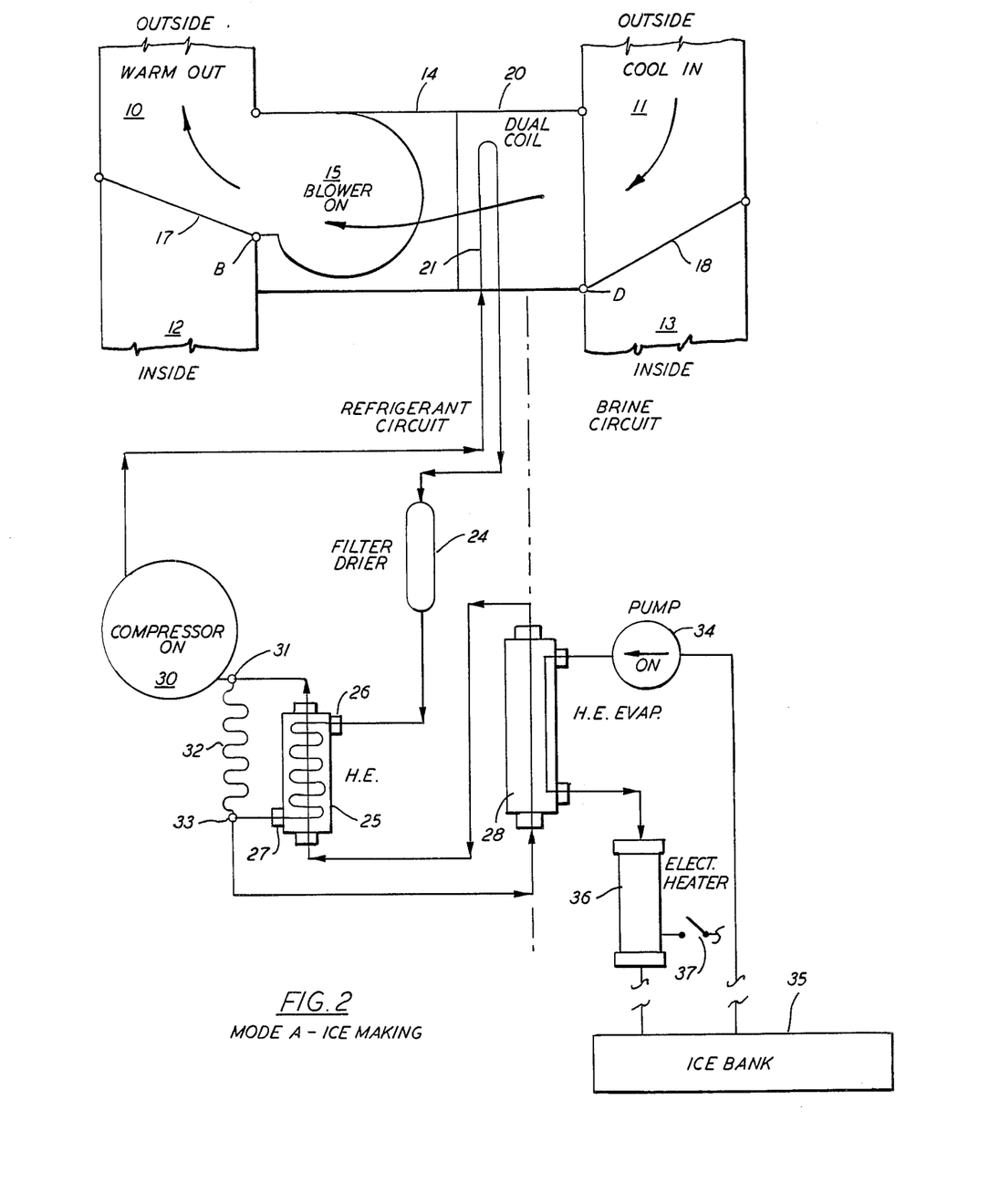
FIG. 2 illustrates the ice-making mode of operation of the system.
Figure 4:
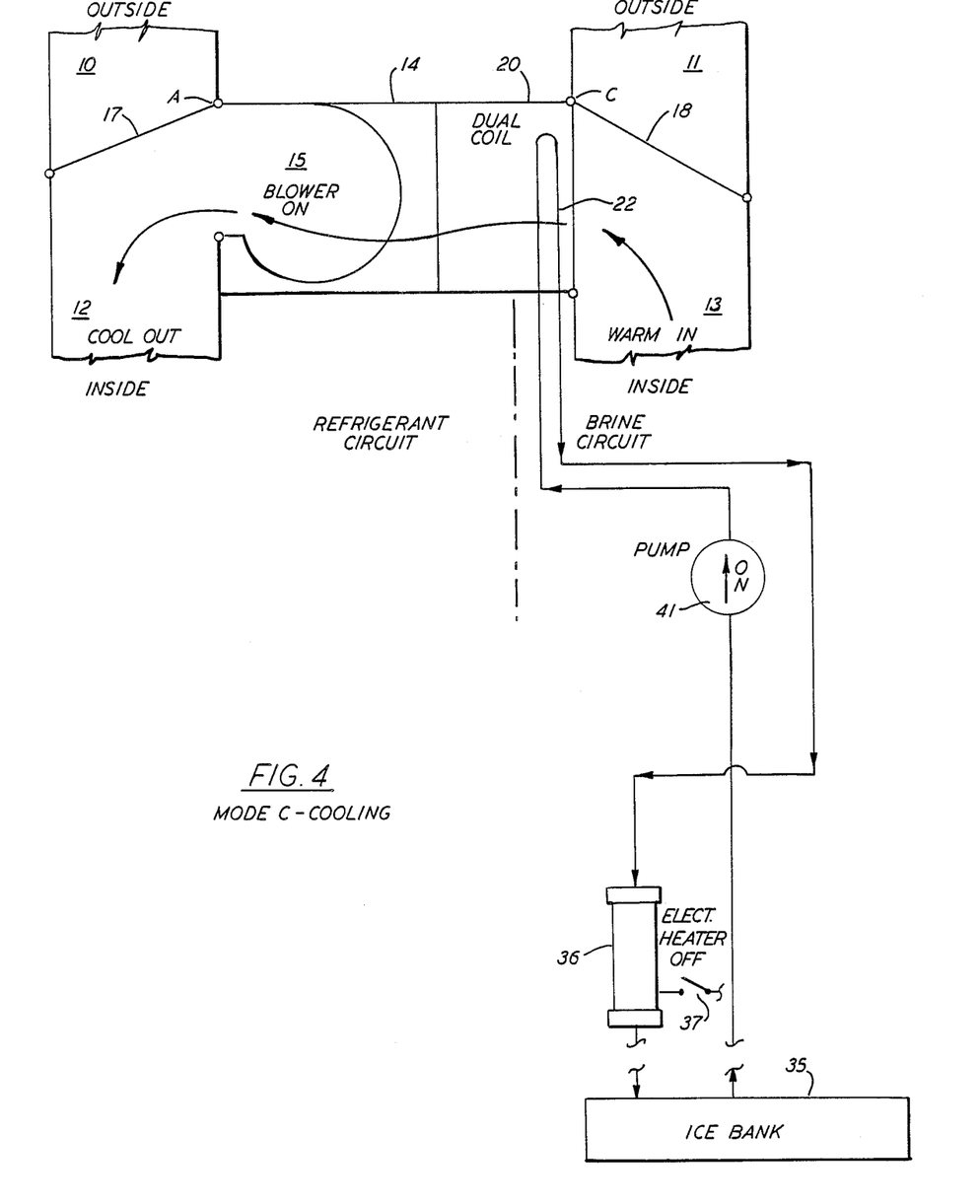
FIG. 4 illustrates the cooling mode of the system.
Figure 5:
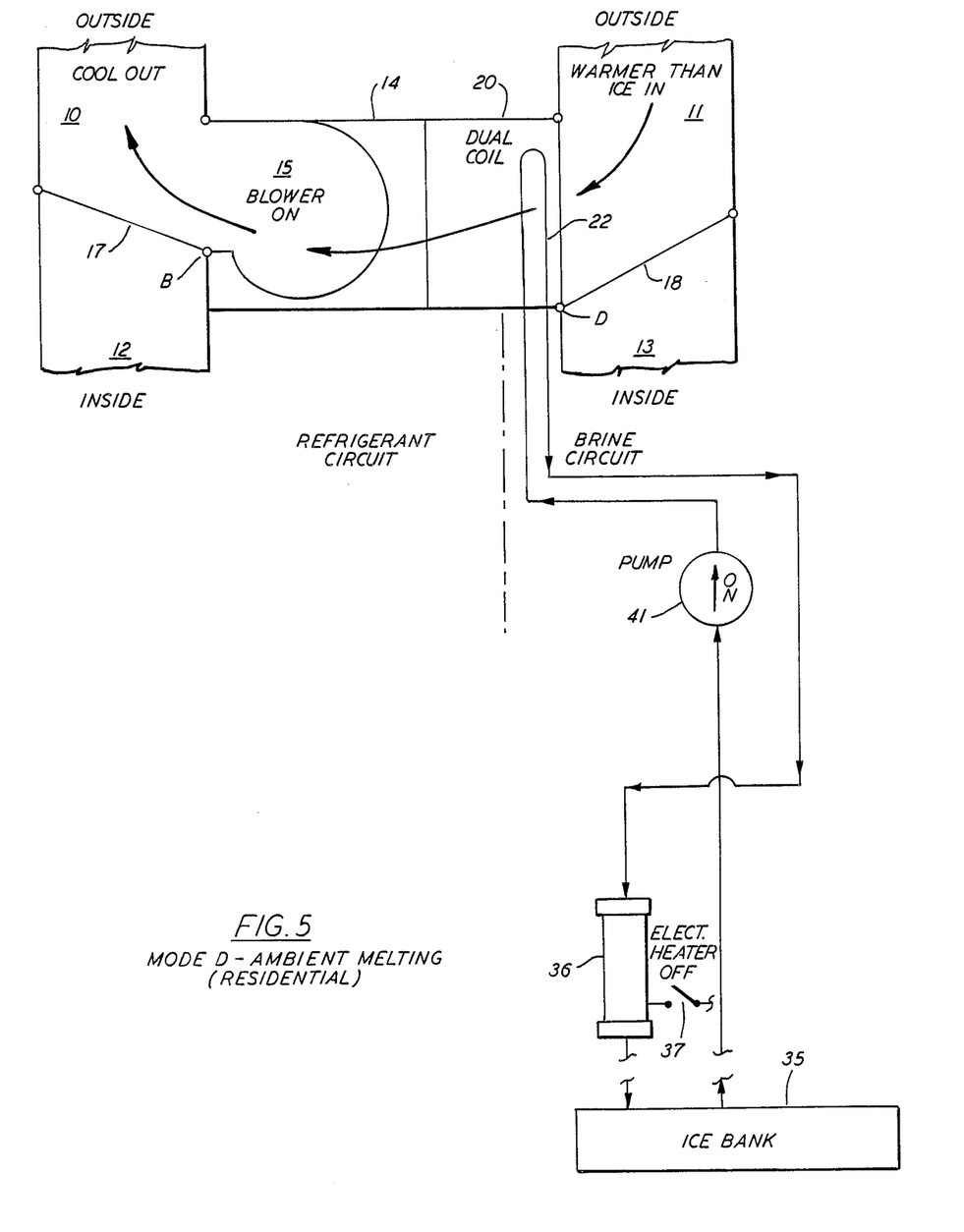
FIG. 5 illustrates the ambient melting mode of the system which is typical of a residential installation.

It will be apparent from the components thus far described that a B setting for the damper 17 and a D setting for the damper 18 will cause the blower to circulate outside air from the duct 11 back to the outside through the duct 10 (see FIGS. 2 and 5). If damper 17 is in the A setting and damper 18 is in the C setting then the blower will circulate air from the inside of the building through duct 13 and return it to the inside of the building through duct 12 (see FIGS. 3 and 4). If the damper 17 is in the A position and the damper 18 is in the D position then outside air will be circulated by the blower through the duct 11 and into the building through the duct 12 (see FIG. 7). Finally if the damper 17 is in the B setting and damper 18 is in the C setting then air will be circulated from the inside of the building through duct 13 to the outside of the building through duct 10 (see FIG. 8).

A dual coil 20 is located in the plenum 14 in a manner such that when the blower 15 is activated all circulated air passes over and between its heat exchange tubes, which include a refrigerant loop 21 and a brine loop 22. It may be of the form where three alternate rows of tubing carry refrigerant and three alternate rows carry brine, with common fins providing extended heat exchange surfaces. The refrigerant may be a fluorinated hydrocarbon such as that manufactured under the trademark Freon and the brine may be an ethylene glycol and water anti-freeze mixture. Either the refrigerant loop 21 or the brine loop 22 is in operation at a given time but not both simultaneously, though their common fins enhance the heat exchange effect when either is in operation. Hence the dual coil is less expensive and more compact than two separate coils.

Figure 1:
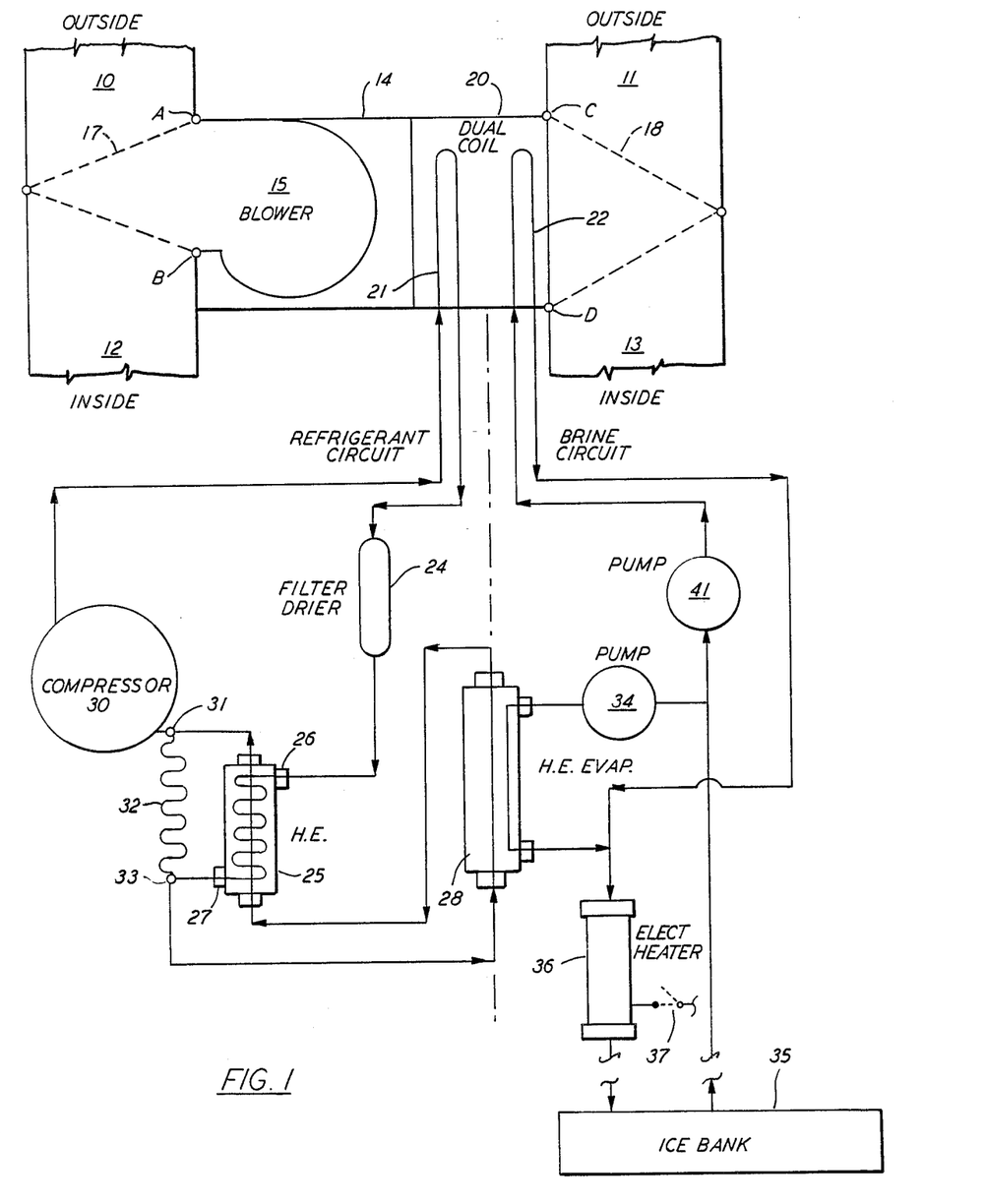
FIG. 1 is a schematic illustration of the entire system including both the refrigerant and brine circuits and their respective components.

For clarity a refrigerant circuit associated with the refrigerant loop 21 is shown to the left of a vertical dot-dash line in FIG. 1 and a brine circuit associated with the brine loop 22 is illustrated to the right of that dot-dash line. The refrigerant circuit will be described first and then the brine circuit.

Exiting from the refrigerant loop 21, condensed liquid refrigerant proceeds to a filter-drier 24 which serves to remove water and particles therefrom. The refrigerant at this point is typically at a temperature of about 120 degrees F. After leaving the filter-drier 24 the condensed refrigerant enters a liquid-suction heat exchanger 25 through an inlet 26 and exits therefrom through an outlet 27. In so doing the condensed refrigerant passes in counterflow heat exchange relation with the same refrigerant in its very cold gaseous form proceeding to the suction side of a compressor as described hereinafter. The temperature of the condensed refrigerant exiting from the liquid-suction heat exchanger 25 may be as low as 90 degrees F. It then enters the base of a heat exchanger-evaporator 28 where it evaporates at the top to gas and emerges at a temperature as low as about 20 degrees F. Within the heat exchanger-evaporator 28 the refrigerant passes in counterflow heat exchanger relation with a portion of the brine circuit as will be described hereinafter. Preferably the heat exchanger-evaporator is of a vertically mounted shell-and-tube design with flooded liquid refrigerant within vertical tubes to boil the refrigerant out of the top end of the tubes without superheat in a saturated temperature condition.

The cold gaseous refrigerant then passes through the liquid-suction heat exchanger 25 to chill the incoming condensed refrigerant and superheat the gaseous refrigerant. The gaseous refrigerant then proceeds to the suction side of a compressor 30 with its temperature several degrees above the saturated condition. Before reaching the compressor 30 the gaseous refrigerant passes in contact with temperature sensing means 31 which by suitable circuitry 32 operates an expansion valve 33 to vary flow to the heat exchanger-evaporator 28 to adjust and control the superheat of the gaseous refrigerant and thus minimize entry of liquid into the compressor 30. This avoids slugging of the compressor. The compressor may be a three-phase 230 volt unit which delivers hot gaseous refrigerant back to the refrigerant loop 21 of the dual coil 20 at a temperature of approximately 180 degrees F.

It is important to note that there are no refrigerant reversing valves in the refrigerant circuit and its flow is always unidirectional in the manner described. In the various modes of operation described below, air circulated by the blower 15 through the coil 20, whether from the outside through duct 11 or from the inside through duct 13, cools the refrigerant gas in the refrigerant loop 21 and causes it to condense. The refrigerant loop 21 of the dual coil always functions as a condenser.

Turning now to the brine circuit it includes in all of its modes of operation a coolness and low level heat storage container which is indicated in FIG. 1 as an ice bank 35. A phase-change material such as water surrounds brine tubing in such an ice bank to store coolness when it is frozen and to store low-level heat when it is melted. Before entering the ice bank 35 the brine in the circuit passes through an electric heater 36 which may be selectively operated by a schematically illustrated switch 37.

There are two subcircuits within the brine circuit. The first subcircuit is operated by a first pump 39 which directs brine at approximately 31 degrees F. through the heat exchanger-evaporator 28 to be chilled by the evaporating refrigerant therein to a temperature of approximately 25 degrees F., so that when it returns to the ice bank 35 it will freeze the water therein. In the second subcircuit of the brine circuit a second pump 41 directs the brine leaving the ice bank 35 to the brine loop 22 to cool air passing through the dual coil 20 whether from the outside duct 11 or the inside duct 13. When the first pump 39 is operating the second pump 41 and second subcircuit are not operating and conversely operation of the second pump 41 means that the first pump and first subcircuit are not operating.

FIG. 2 illustrates what is referred to as the ice making mode A of the system. The damper 17 is in its B position and the damper 18 is in its D position so that by means of the blower 15 outside air is drawn through the dual coil 20 and returned to the outside. This is typically a night-time mode of operation wherein the refrigerant loop 21 is cooled by night air. The brine loop 22 and the second subcircuit of the brine loop are not in operation during this mode (and therefore are not shown). The compressor 30 is on and therefore the refrigerant is evaporating to gas in the heat exchanger-evaporator 28 to chill the brine in the first brine subcircuit as it is directed by the first pump 39 from the ice bank 35. The electric heater 36 is off during this mode and therefore the switch 37 is open. Ice making is carried out economically during night-time off-peak conditions in both the residential and the commercial forms of the system of the invention.

Figure 3:
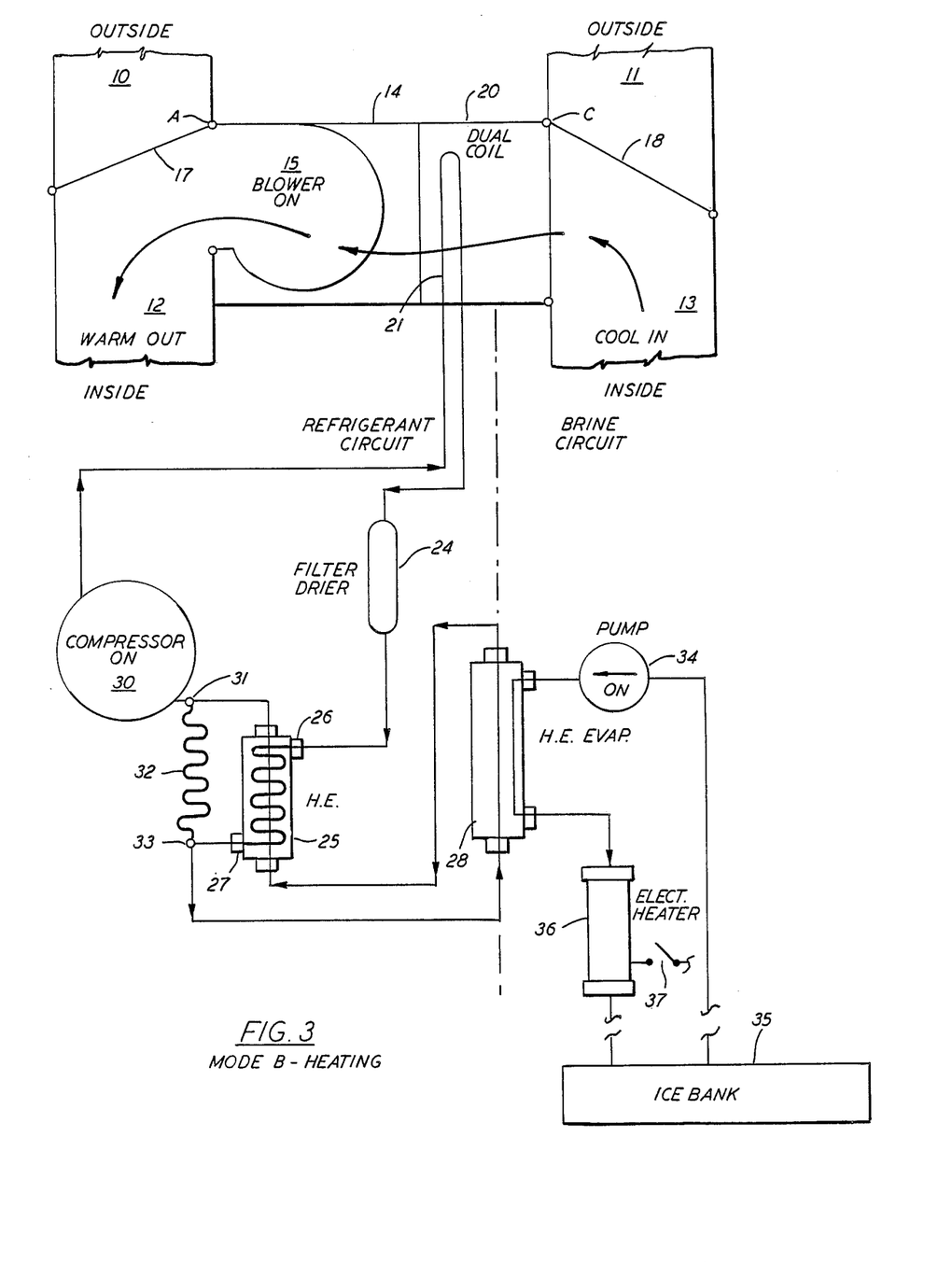
FIG. 3 illustrates the heating mode of the system.

FIG. 3 illustrates the heating mode B of the system. The settings of all components are the same as for the ice making mode B except that the dampers are reversed. The damper 17 is in its A setting and the damper 18 is in its C setting so that inside air is passed through the dual coil and returned to the inside of the building. As a result heat rejected in the coil 20 is sent down into the building and ice is produced in the ice bank 35. Again, the electric heater 36 and the brine loop 22 are not operating.

FIG. 4 illustrates the cooling mode C of the system. This is the air conditioning mode put into effect during hot peak-load daytime conditions. The blower 15 sucks air from the building, the air is chilled by the brine and the cool air is blown back into the building. Therefore the damper 17 is at its A setting and the damper 18 is at its C setting. The refrigerant circuit and first brine subcircuit are inactivated entirely (hence not shown) and the brine circuit with its second subcircuit is in operation. The electric heater 36 in the brine circuit is off. It is important to note that during this peak-load cooling period the compressor is off and draws no electric power whatever. These are the peak-load conditions when utilities commonly pay subsidies for using less electrical power and the cooling mode C certainly qualifies because no work at all is required of the compressor in the system.

FIG. 5 illustrates an ambient melting mode D typical of a residential installation. This is a night-time operation during off-peak electricity demand. The damper 17 is in its B setting and damper 18 is in its D setting so that warm outside air is passed through the brine loop 22 in the dual coil 20 and returned to the outside. This warms the brine to slightly more than the melting temperature of the phase-change material in the ice bank (e.g. water) and therefore the system is operating as a low-level heat storage system. The electric heater 36 is off under these conditions. It is important to note in this mode that during cooler weather outdoor air may be used, if above the freezing point, to melt ice produced during the heating mode B without having to use electricity. This provides an air-to-air heat pump without the danger of coil frosting and therefore no defrosting device is needed. It stores daytime temperatures above freezing and delivers them to the heat pump at night or for early morning warm-up when temperatures are below freezing at a time when heat pumps do not work efficiently. Therefore, the nightly set-back of space thermostats can be utilized for conservation where ordinarily that cannot be done because of the low temperatures. The coil cannot frost because it only receives temperatures above that of melting ice.

Figure 6:
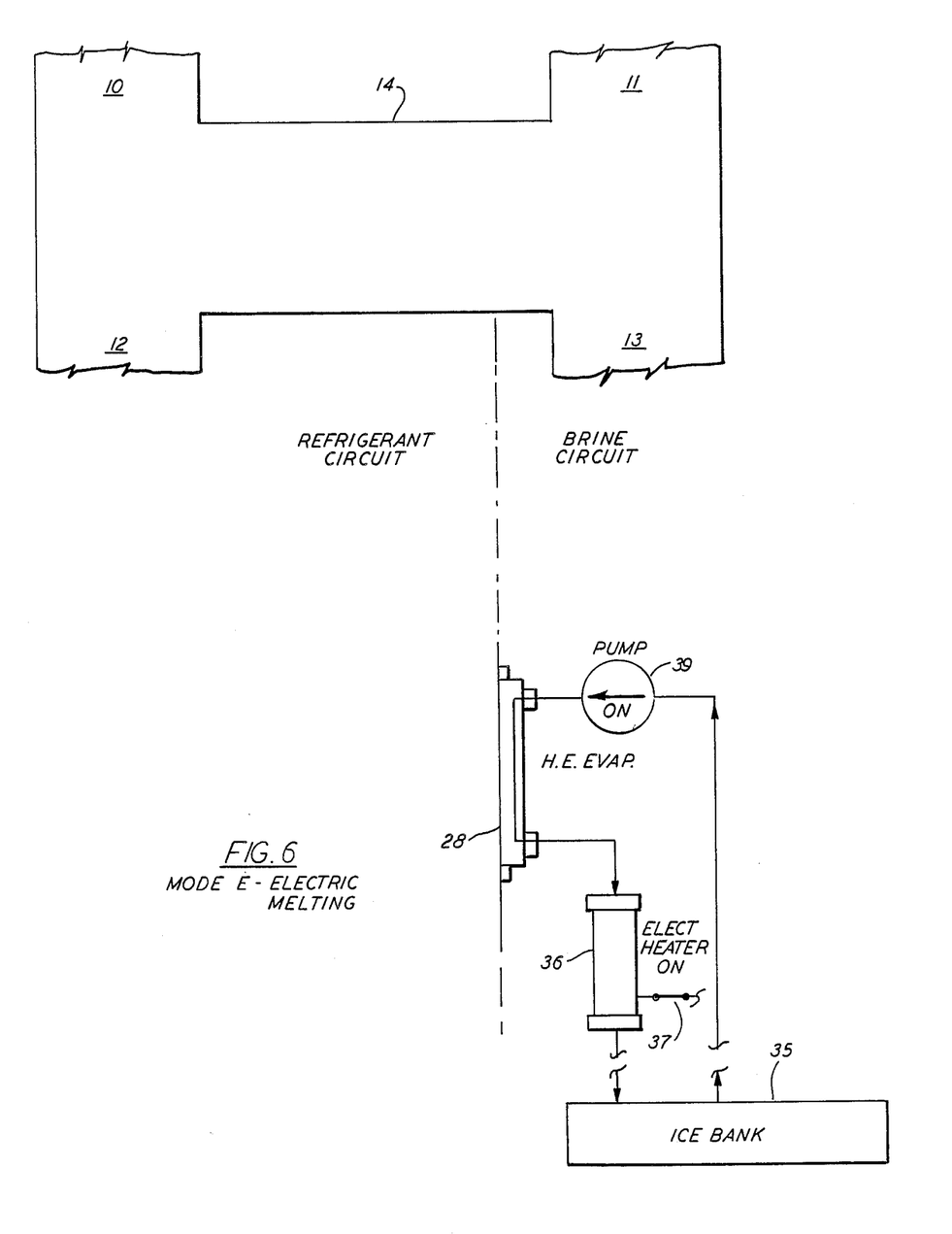
FIG. 6 illustrates the electric melting mode of the system.

FIG. 6 illustrates the electric melting mode E. Here the blower 15 is off and there is no air circulating through the ducts. The refrigerant circuit is closed down entirely and only the brine circuit with its first subcircuit and pump 39 is in operation. The electric heater, which may be of a 12 kilowatt capacity, is on. This is another night-time operation which constitutes low-level heat storage and it is put into operation during times of off-peak electrical demand.

Figure 7:
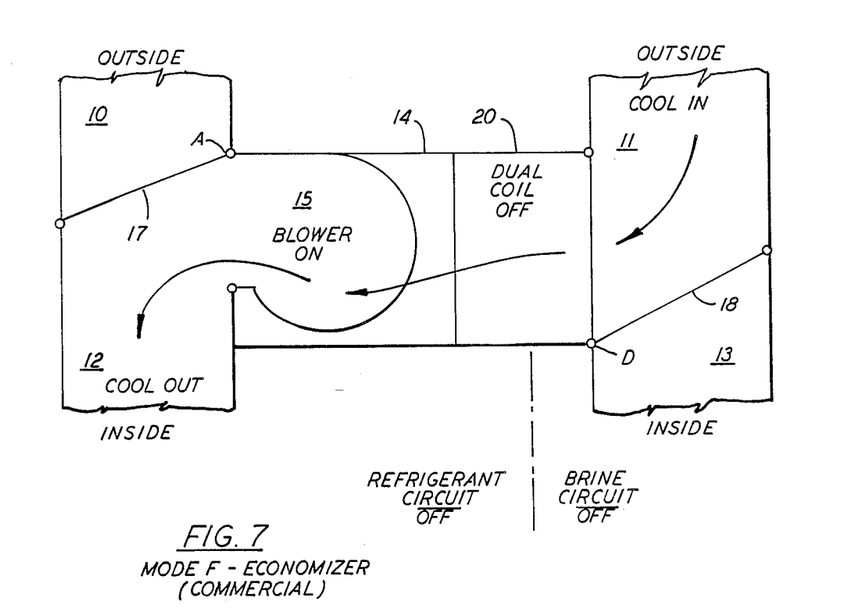
FIG. 7 illustrates the so-called economizer mode of the system.

FIG. 7 illustrates the economizer mode typical of a commercial installation. Here both the refrigerant circuit and the brine circuit are completely shut down and the damper 17 is in its A setting while the damper 18 is in its D setting. With the blower 15 on, cool outside air is drawn into the building from the duct 11 through the duct 12.

Figure 8:
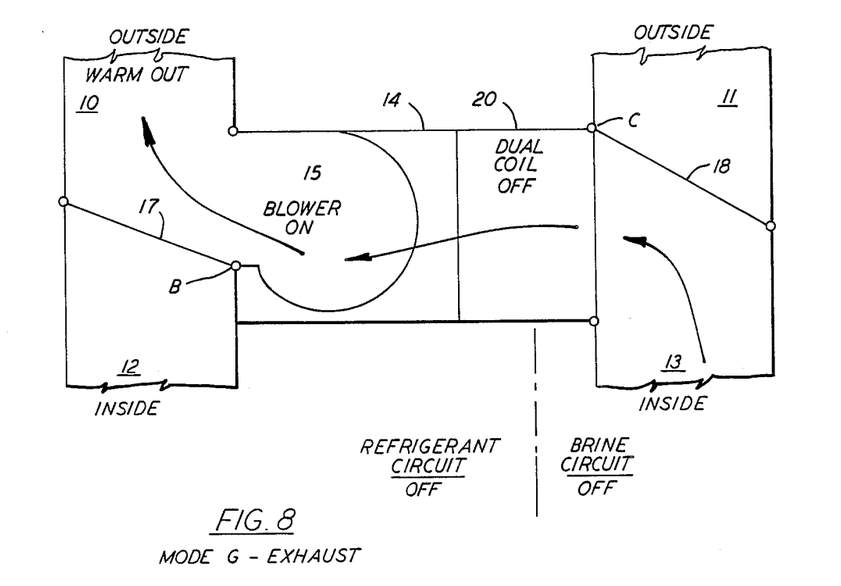
FIG. 8 illustrates the exhaust mode of the system.

FIG. 8 illustrates the exhaust mode G which is the opposite of the economizer mode. Here the refrigerant and brine circuits are off and the damper 17 is in its B setting while the damper 18 is in its C setting. With the blower 15 on, air inside the building is drawn out from the duct 13 through the duct 10 so as to exhaust smoke or unclean air.

Some variations may be made in these different modes of operation. For example a night heating mode could be created simply by placing a heater in the duct 12 leading to the inside of the building. A by-pass may be installed across the inlet and outlet of the ice bank 35 to provide another type of night heating mode when electric melting is not being used as in FIG. 6. The system would operate as in FIG. 4 except that the ice bank 35 would be by-passed and the heater 36 would be on. A further use of the by-pass would be to limit operation of the ice bank under certain variations of brine temperature as described in MacCracken U.S. Pat. No. 4,565,069. Auxillary components for all of these parts of the system have not been described because they are commonly known in the art, such as appropriate sight glasses where needed, a drain pan beneath the dual coil, automatic damper operating devices, other controllers, etc.

The system of the invention operates as a heat pump providing heating and cooling without reversing valves, no defrost cycle is required, all controls are simplified, the refrigerant is evaporated in a heat exchanger which always operates as an evaporator and the refrigerant coil always operates as a condenser.

The scope of the invention is to be determined from the following claims rather than the foregoing preferred embodiment.

We claim:

1. A multi-mode off-peak storage heat pump system for a building comprising
   (a) ducts for conveying air within and between the inside and outside of the building;
   (b) a single selectively operable blower in said ducts for circulating air therethrough;
   (c) damper means in said ducts having selective settings for directing the air within and between the inside and outside of the building;
   (d) selectively operable dual coil means in said ducts having refrigerant condensing and brine air-cooling loops;
   (e) a selectively operable unidirectional refrigerant circuit comprising
      (i) a compressor for directing gaseous refrigerant to the refrigerant loop to be air-cooled and condensed,
      (ii) a heat exchanger-evaporator in which the condensed refrigerant from the refrigerant loop is evaporated to gas; and
   (f) a selectively operable brine circuit comprising
      (i) a coolness and low level heat storage container through which brine is circulatable in heat exchange relation with a phase-change material,
      (ii) a selectively operable electric heater for warming the brine entering the storage container to melt the phase-change material, and
      (iii) pump means for directing the brine leaving the storage container through one of a first subcircuit to the heat exchanger-evaporator for chilling of the brine to below the freezing temperature of the phase-change material and a second subcircuit to the coil means brine loop for cooling of air;
   (g) whereby said system is operable in various alternative modes including operating the refrigerant and brine circuits and first brine subcircuit with an outside-to-outside damper setting to freeze the phase-change material with chilled brine and with an inside-to-inside damper setting to additionally heat inside air, and operating only the brine circuit and its second subcircuit with an inside-to-inside damper setting to cool inside air and with an outside-to-outside damper setting to melt the phase-change material by outside air heat and with no air circulation to melt the phase-change material by electric heat during offpeak loads, and operating neither circuit with an outside-to-inside damper setting to cool inside air and with an inside-to-outside damper setting to exhaust inside air.

2. A multi-mode off-peak storage heat pump system according to claim 1 wherein the coil means comprises a unitary coil device containing dual refrigerant condensing and brine air-cooling loops.

3. A multi-mode off-peak storage heat pump system according to claim 1 wherein the heat exchanger-evaporator is of a vertically mounted shell-and-tube design with flooded liquid refrigerant within vertical tubes to evaporate the refrigerant without superheat.

4. A multi-mode off-peak storage heat pump system according to claim 1 wherein a liquid-suction heat exchanger is provided in the refrigerant circuit between the refrigerant loop and the heat exchanger-evaporator for cooling the condensed refrigerant and superheating the gaseous refrigerant entering the compressor.

5. A multi-mode off-peak storage heat pump system according to claim 1 wherein an expansion valve is provided in the refrigerant circuit ahead of the heat exchanger-evaporator for controlling flow of the cooled condensed refrigerant.

6. A multi-mode off-peak storage heat pump system according to claim 5 wherein temperature sensing means are included between the heat exchanger-evaporator circuit and the compressor for operating the expansion valve to minimize entry of liquid into the compressor.

7. A multi-mode off-peak storage heat pump system for a building comprising
   (a) ducts for conveying air within and between the inside and outside of the building;
   (b) a single selectively operable blower in said ducts for circulating air therethrough;
   (c) damper means in said ducts having selective settings for directing the air within and between the inside and outside of the building;
   (d) selectively operable dual coil means in said ducts having refrigerant condensing and brine air-cooling loops;
   (e) a selectively operable unidirectional refrigerant circuit comprising
      (i) a compressor for directing gaseous refrigerant to the refrigerant loop to be air cooled and condensed,
      (ii) a liquid-suction heat exchanger in which the condensed refrigerant is cooled,
      (iii) an expansion valve for controlling flow of the cooled condensed refrigerant,
      (iv) a vertically mounted shell-and-tube heat exchanger-evaporator in which the condensed refrigerant floods vertical tubes and is evaporated to gas without superheat and is then superheated in the liquid-suction heat exchanger and directed back to the compressor, and
      (v) temperature sensing means between the heat exchanger-evaporator and the compressor for operating the expansion valve to control the superheating of the gaseous refrigerant and minimize entry of liquid into the compressor; and
   (f) a selectively operable brine circuit comprising
      (i) a coolness and low-level heat storage container through which brine is circulatable in heat exchange relation with a phase-change material,
      (ii) a selectively operable electric heater for warming the brine entering the storage container to melt the phase-change material, and
      (iii) pump means for directing the brine leaving the storage container through one of a first subcircuit to the heat exchanger-evaporator for chilling of the brine to below the freezing temperature of the phase-change material and a second subcircuit to the coil means brine loop for cooling of air;
   (g) whereby said system is operable in various alternative modes including operating the refrigerant and brine circuits and first brine subcircuit with an outside-to-outside damper setting to freeze the phase-change material with chilled brine and with an inside-to-inside damper setting to additionally heat inside air, and operating only the brine circuit and its second subcircuit with an inside-to-inside damper setting to cool inside air and with an outside-to-outside damper setting to melt the phase-change material by outside air heat and with no air circulation to melt the phase-change material by electric heat during offpeak loads, and operating neither circuit with an outside-to-inside damper setting to cool inside air and with an inside-to-outside damper setting to exhaust inside air.

* * * * *